(12) United States Patent
Morrow

(10) Patent No.: US 8,511,858 B2
(45) Date of Patent: Aug. 20, 2013

(54) AIRFIELD LUMINAIRE HAVING OPTICAL REMOVABILITY

(75) Inventor: Glenn Morrow, Westerville, OH (US)

(73) Assignee: ADB Airfield Solutions, LLC, Columbus, OH (US)

( * ) Notice: Subject to any disclaimer, the term of this patent is extended or adjusted under 35 U.S.C. 154(b) by 182 days.

(21) Appl. No.: 12/898,184

(22) Filed: Oct. 5, 2010

(65) Prior Publication Data

US 2011/0080097 A1 Apr. 7, 2011

Related U.S. Application Data

(60) Provisional application No. 61/249,296, filed on Oct. 7, 2009.

(51) Int. Cl.
*F21V 33/00* (2006.01)
(52) U.S. Cl.
USPC ....... 362/253; 362/311.14; 362/173; 362/177
(58) Field of Classification Search
USPC ............... 362/311.14, 177, 173, 186, 431
See application file for complete search history.

(56) References Cited

U.S. PATENT DOCUMENTS

| 3,501,627 | A | | 3/1970 | Macemon | |
|---|---|---|---|---|---|
| 4,425,602 | A | * | 1/1984 | Lansing | 362/186 |
| 4,521,836 | A | * | 6/1985 | Puttemanns et al. | 362/145 |
| 2005/0168976 | A1 | * | 8/2005 | Chen | 362/186 |
| 2006/0171146 | A1 | * | 8/2006 | Bensinger et al. | 362/208 |
| 2007/0121329 | A1 | * | 5/2007 | Morrow et al. | 362/311 |
| 2007/0153520 | A1 | | 7/2007 | Curran et al. | |

FOREIGN PATENT DOCUMENTS

| EP | 0 994 293 A2 | 4/2000 |
|---|---|---|
| WO | WO 02/066889 A1 | 8/2002 |

OTHER PUBLICATIONS

PCT/US10/51579 International Search Report and Written Opinion of the International Searching Authority dated Jul. 22, 2011.

* cited by examiner

*Primary Examiner* — Evan Dzierzynski
(74) *Attorney, Agent, or Firm* — Tucker Ellis LLP

(57) ABSTRACT

Described in an example embodiment is an airfield light where the optical system can be easily removed, e.g., no tools. This allows maintenance of the optical system to be performed elsewhere, reducing the amount of time that airfield maintenance crews have to be spend on the field.

5 Claims, 7 Drawing Sheets

AIRFIELD LUMINAIRE HAVING OPTICAL REMOVABILITY

CROSS REFERENCE TO RELATED APPLICATIONS

This application claims the benefit of U.S. Provisional Application No. 61/249,296, filed Oct. 7, 2009.

TECHNICAL FIELD

The present disclosure relates generally to airfield lighting devices.

BACKGROUND

Airfield maintenance crews are continually pressed for time to change non-working airfield lamps. Runways and taxiways have to be shut down while the maintenance crews are working on the airfield lamp which is expensive to the airport and carriers.

BRIEF DESCRIPTION OF THE DRAWINGS

The accompanying drawings incorporated herein and forming a part of the specification illustrate the examples embodiments.

OVERVIEW OF EXAMPLE EMBODIMENTS

Figure 1:
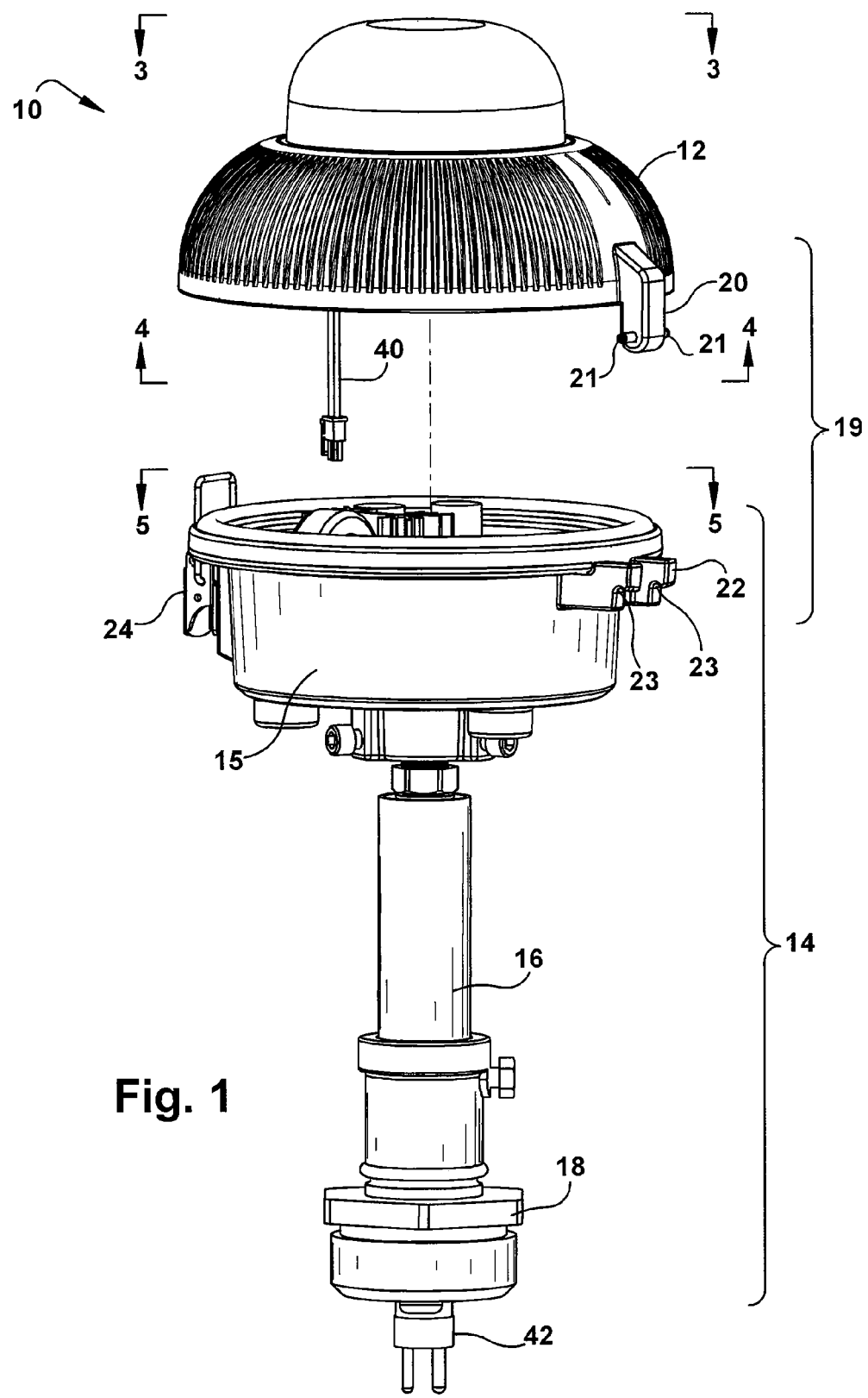
FIG. 1 is an exploded view illustrating an example of an airfield luminaire having optical removability.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein, an apparatus comprising a bottom surface, a light source mounted on the bottom surface, a lens coupled with the bottom surface, and a cover for retaining the lens. The cover comprises at least one strike suitable for engaging a hinge.

In accordance with an example embodiment, there is disclosed herein an apparatus comprising an optical portion and base portion. The optical portion comprises a bottom surface, a light source mounted on the bottom surface, a lens coupled with the bottom surface, and a cover for retaining the lens onto the bottom surface, wherein the cover comprises at least one strike. The base portion comprises a base plate, a frangible coupler coupled with the base plate and an extension for elevating the optical portion above ground, a circuit for controlling the intensity of the light source, and at least one hinge. The optical portion is retained onto the base portion while the at least one hinge engages the at least one strike.

In accordance with an example embodiment, there is disclosed herein an apparatus comprising an optical portion that comprises a bottom surface, a light source mounted on the bottom surface, a lens coupled with the bottom surface, and a cover for retaining the lens. The apparatus further comprises a base portion that comprises a base plate, a frangible coupler coupled with the base plate and an extension for elevating the optical portion above ground, and a circuit for controlling the intensity of the light source. In addition, the apparatus comprises means for coupling the optical portion with the base portion.

Description of Example Embodiments

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Described in an example embodiment herein is an airfield luminaire having an optical portion that is removable from the base portion of the luminaire. The optical portion holds the light source, such as a light emitting diode (LED), while the base portion contains the electronics for controlling operation of the light source.

Referring to FIG. 1, there is illustrated an exploded view illustrating an example of an airfield luminaire 10 having optical removability. Optical portion 12 is configured be securely mounted on to base portion 14. Base portion 14 comprises a housing that is elevated off the ground by an extension 16, coupled with a frangible coupling. In the illustrated example, a pivot 19 is formed by surface 20 by protrusions 21 on optical portion 12 engaging recesses 23 on surface 22 on housing 15; however, those skilled in the art should readily appreciate that any suitable means for forming a pivot may be employed. Hinge 24 engages strike 36 (see e.g. FIG. 2). Connector 42 is employed to couple luminaire to a power source (not shown).

Figure 2:
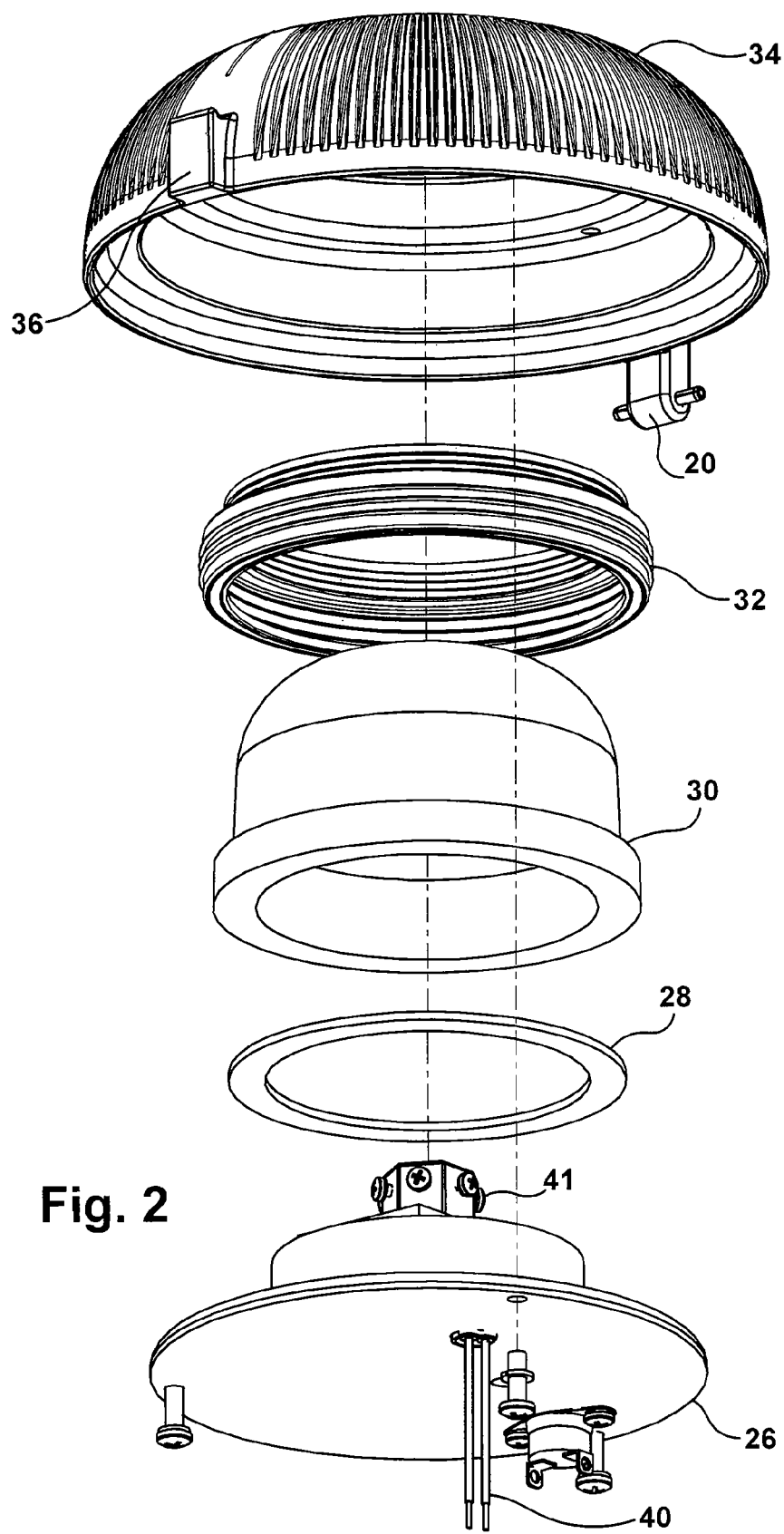
FIG. 2 is an exploded view of the optical portion of the luminaire illustrated in FIG. 1.

Referring to FIG. 2, with continued reference to FIG. 1, there is illustrated an exploded view of the optical portion 12 of the luminaire 10 illustrated in FIG. 1. The optical portion 12 of luminaire 10 comprises a bottom surface 26. A light source 41 is mounted on bottom surface 26. In an example embodiment, the light source is a LED light source having at least one LED. Any suitable number of LED's may be employed by light source 41 to obtain the desired intensity. Gasket 28 forms a seal between bottom surface 26 and glassware 30. Lens gasket 32 forms a seal around glassware 30 when engaged by cover 34. Cover 34 comprises surface 20 that has portions 21 suitable for engaging recesses (e.g., recesses 23 FIG. 1) on base portion 14. Cover 32 further comprises strike 36 for engaging latch 24 illustrated in FIG. 1. Conductors 40 are employed to couple light source 41 to the appropriate electronics (not shown, see e.g., FIGS. 5 and/or 8-10) located in base portion 14.

The illustrated example employs a hinge 24 and a pivot 19 to mount optical portion 12 onto base portion 14, however, as those skilled in the art an readily appreciate other suitable configurations may be employed allowing for the easy removability of optical portion 12 from base portion 14. For example, a plurality of hinges 24 may be employed instead of a hinge 24 and a pivot 19.

Figure 3:
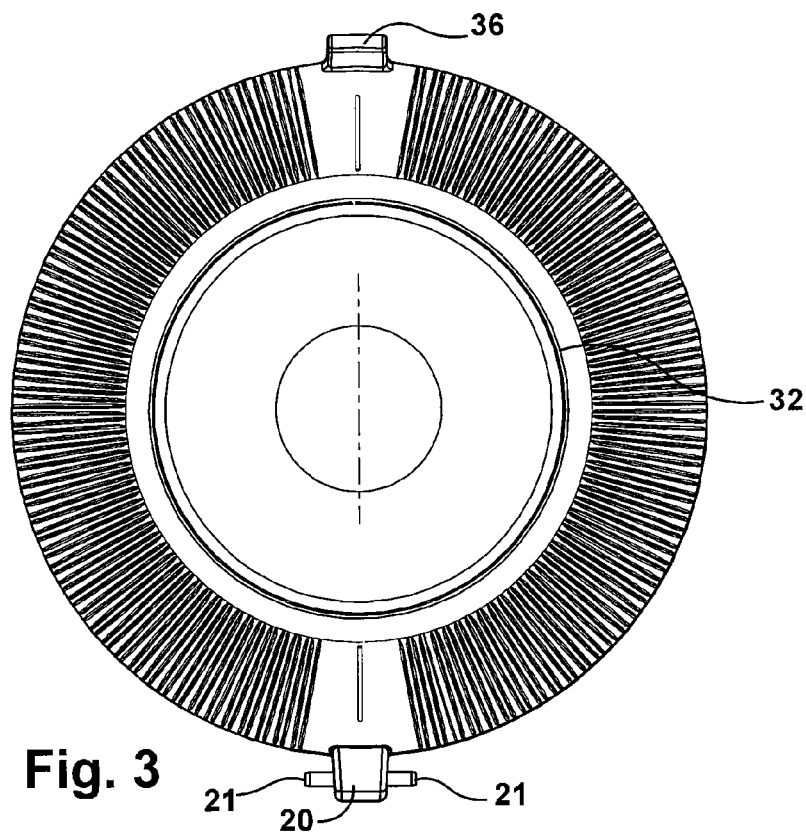
FIG. 3 is a top view of the of the optical portion of the luminaire illustrated in FIG. 1
Figure 4:
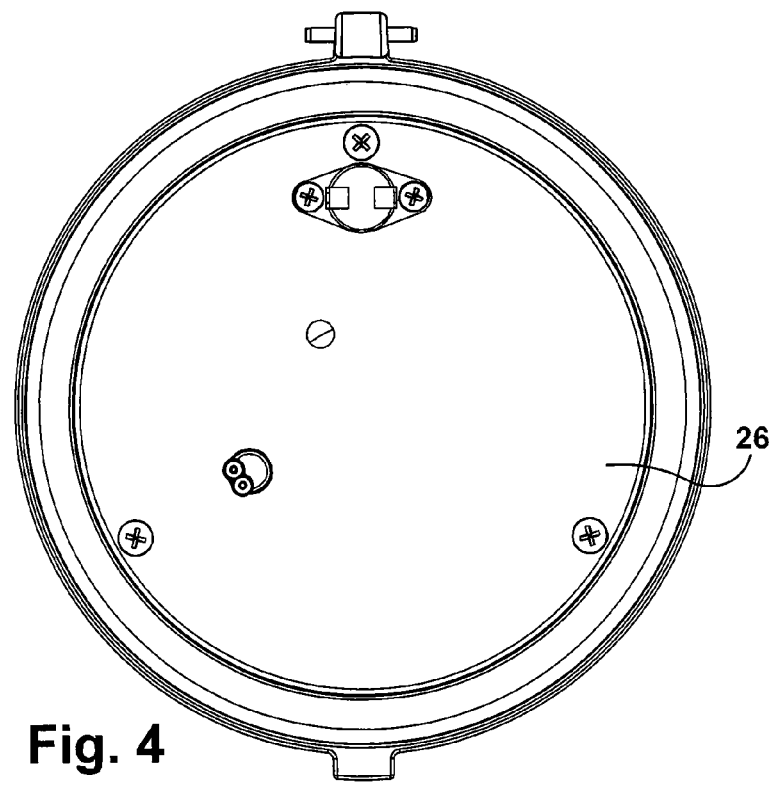
FIG. 4 is a bottom view of the optical portion of the luminaire illustrated in FIG.

FIG. 3 is a top view of the optical portion 12 of luminaire 10 illustrated in FIG. 1. FIG. 4 is a bottom view of the optical portion 12 of luminaire 10 illustrated in FIG. 1.

Figure 5:
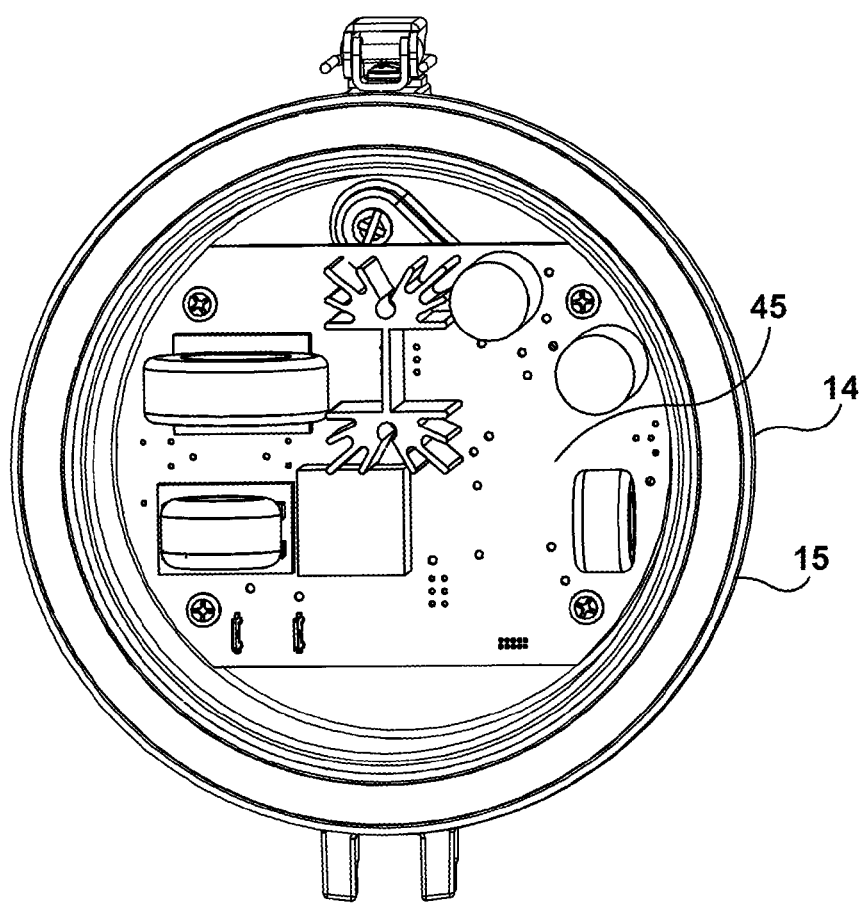
FIG. 5 is a view of the top portion of the base section of the luminaire illustrated in FIG. 1.

FIG. 5 is a view of the top portion 45 of the base section 14 of luminaire 10 illustrated in FIG. 1. In an example embodiment, the top portion 45 of base section 14 inside housing 15 contains the electronics for driving the light source 41. In an example embedment, top portion 45, and thus the electronics contained therein, is protected from the elements while optical portion 12 is mounted on base portion 14.

Figure 6:
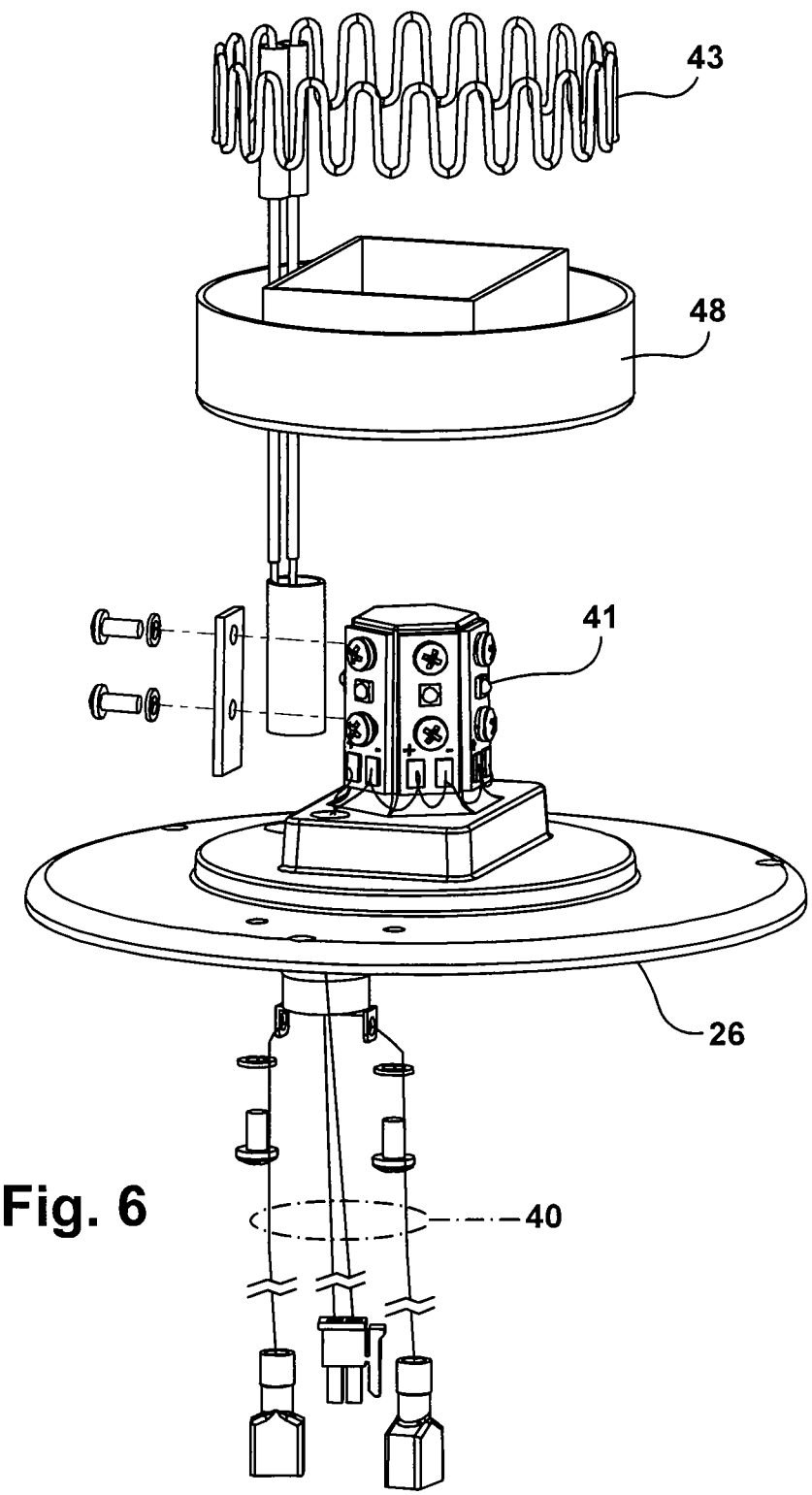
FIG. 6 illustrates an exploded, perspective view of an optical portion of the airfield luminaire illustrated in FIG. 1, where the optical portion comprises a heating element.

FIG. 6 illustrates an exploded, perspective view of the inside of the optical portion 12 of the airfield luminaire illustrated in FIG. 1. Light source 41 is mounted on bottom surface 26. In particular embodiments, optical portion 12 further comprises a heating element 43, and may further include an insulator 48 that insulates light source 41 from heating element 43.

Figure 7:
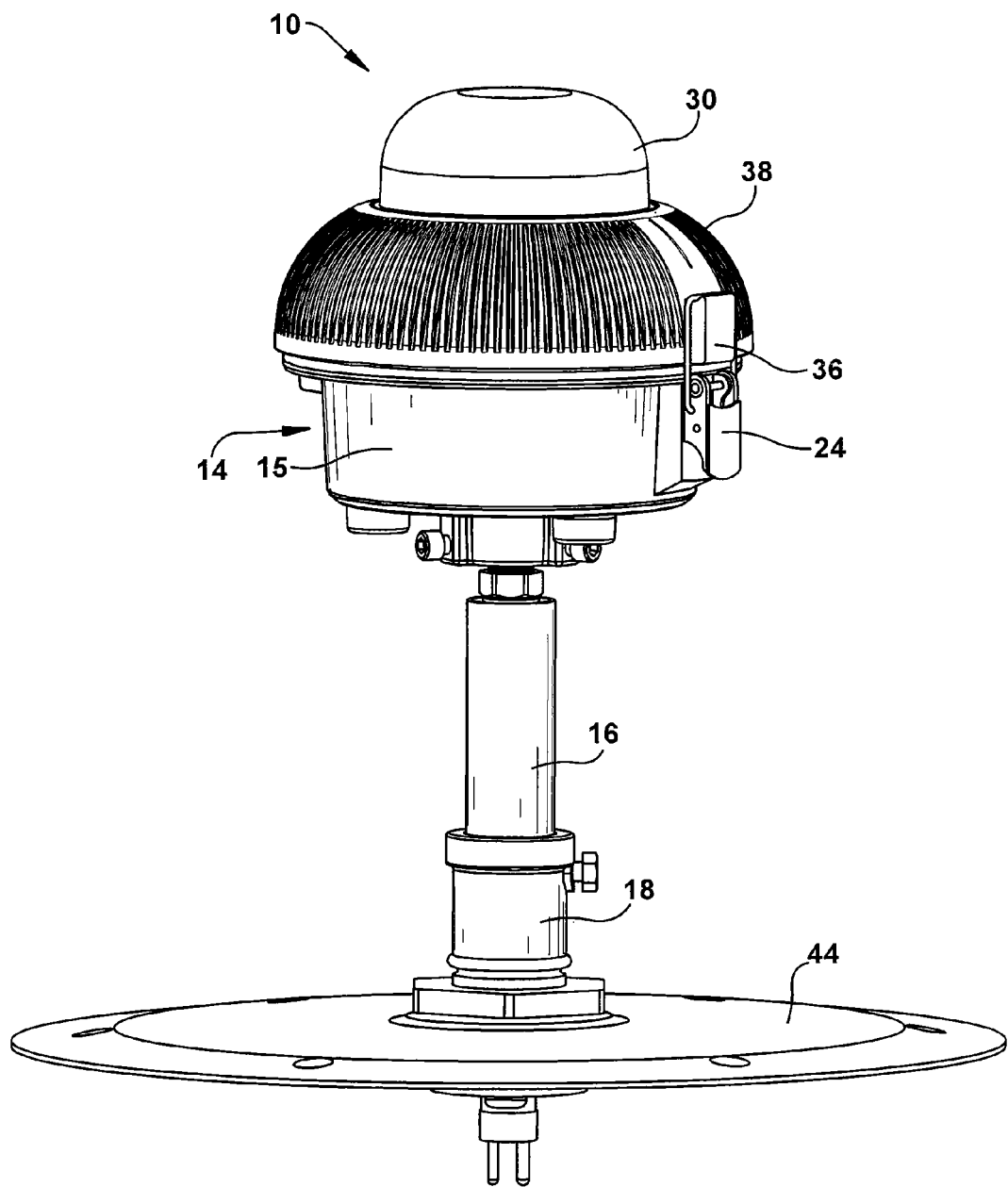
FIG. 7 is a perspective view of the airfield luminaire illustrated in FIG. 1.

FIG. 7 is a perspective view of the airfield luminaire 10 illustrated in FIG. 1 with the optical portion mounted onto the base portion 14. Hinge 24 engages strike 36, holding optical portion 12 in place on base portion 14. Opposite hinge 24 may be an additional hinge (not shown) or a pivot (see e.g., pivot 19 in FIG. 1). In this example, frangible coupling 18 is mounted onto a base plate 44.

Figure 8:
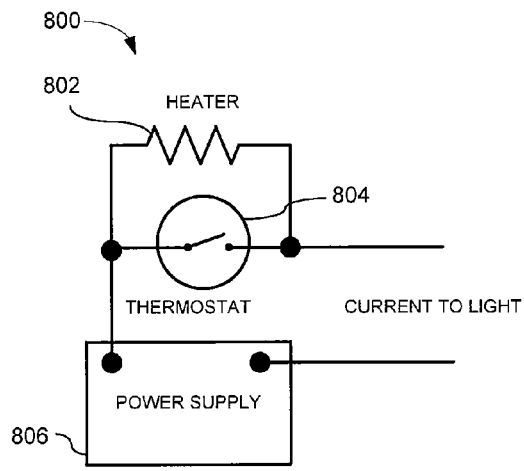
FIG. 8 is a schematic diagram illustrating an example of a heating circuit employed by an airfield luminaire

FIG. 8 illustrates an example of a heating circuit 800 employed in an example embodiment. A heating element 802 is coupled in parallel with thermostat 804. One end of heating element 802 and thermostat 804 is coupled with power supply 806. In operation, when thermostat 804 is closed, the current flows through thermostat 804 and no current flows through heating element 802. When thermostat 804 is open, all of the current flows through heating element 802 and no current flows through thermostat 804. As those skilled in the art can readily appreciate, since the same amount of current will be provided to the light whether the heater is on or off, operation of the heating element does not affect the intensity of the light provided by the light source.

Figure 9:
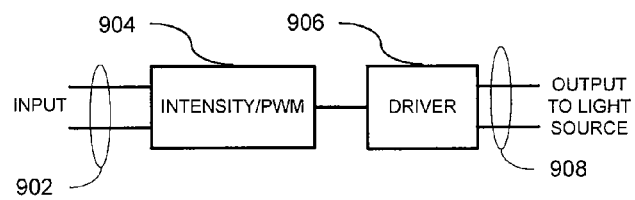
FIG. 9 is a block diagram illustrating an example of the electronics housed in the base section of the luminaire illustrated in FIG. 1.

FIG. 9 is a block diagram illustrating an example of the electronics 900 housed in the base section 14 of the luminaire illustrated in FIG. 1. In the illustrated example, power is received from an external source via an input 902. The power may be received by conductors (for example via connector 42) coupled to a current transformer (not shown) or an isolation transformer (not shown) external to the base portion. Circuit 904 determines from the input current or voltage the appropriate intensity of light and provides the appropriate control action (for example provides an appropriate pulse width modulated current or current level) to the light source (not shown, see e.g., LED 41 in FIG. 1) to achieve the appropriate intensity. In an example embodiment, circuit 904 comprises a microcontroller that provides a pulse width modulated (PWM) signal to control the intensity of the light. Electronics 900 may further comprise a driver circuit 906 such as an LED driver. The output from driver circuit 908 is provided to the optical portion (e.g., 12 in FIG. 1) of the luminaire.

Figure 10:
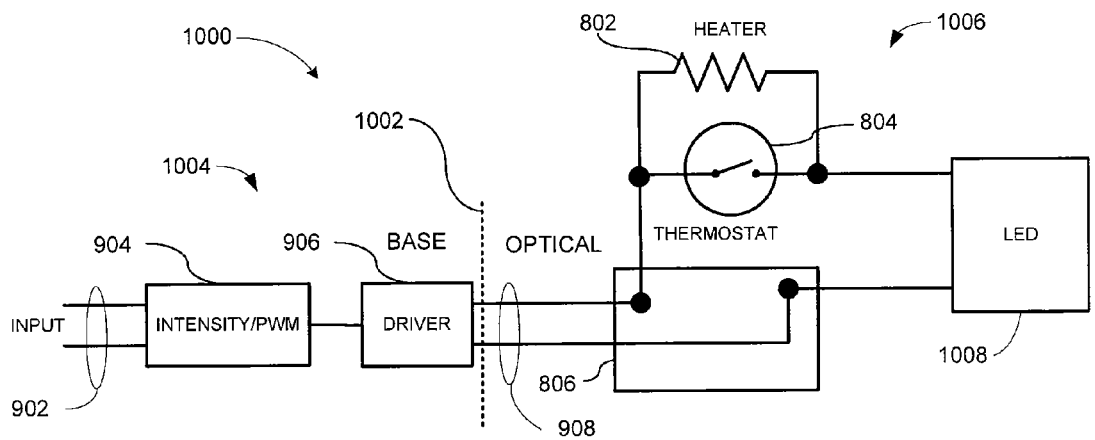
FIG. 10 is a diagram illustrating the electrical components of the base portion and optical portion of an airfield luminaire coupled together.

FIG. 10 is a diagram illustrating the electrical components 1000 of the base portion and optical portion of an airfield luminaire coupled together. In the example illustrated in FIG. 10, the electrical components of the base portion 1004 (corresponding to base portion 14 in FIG. 1) are illustrated to the left line 1002, and the electrical components in the optical portion 1006 (corresponding to the optical portion 12 in FIG. 1) are illustrated to the right of line 1002. For example, conductors 40 illustrated in FIG. 1 may be employed to couple the optical portion 1006 of the airfield luminaire to the base portion 1004 of the airfield luminaire.

An aspect of an example embodiment described herein is that it enables the optical portion of an airfield luminaire to be changed without any tools. This can be useful in situations where the lamp (e.g., incandescent or halogen) or light engine (e.g., LED) fails or the lens is damaged. Moreover, the example embodiment protects the electronics within the light, which can be advantageous for more complex LED light engine designs.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising
   an optical portion that comprises a bottom surface, a light source mounted on the bottom surface, a lens coupled with the bottom surface, and a cover for retaining the lens onto the bottom surface, wherein the cover comprises at least one strike; and
   a base portion that comprises a base plate, a frangible coupler coupled with the base plate and an extension for elevating the optical portion above ground, a circuit for controlling the intensity of the light source, and at least one hinge;
   wherein the optical portion is retained onto the base portion while the at least one hinge engages the at least one strike;
   wherein the optical portion is removably attached to the base portion via the at least one hinge, such that the light source remains mounted on the bottom surface and the cover remains attached to the bottom surface when the optical portion is removed from the base portion;
   wherein the base portion further comprising a light emitting diode (LED) driver circuit coupled with the circuit for controlling the intensity of the light source; and
   wherein the light source in the optical portion is a LED that is electrically, removably coupled with the LED driver circuit while the optical portion is retained onto the base portion.

2. The apparatus of claim 1, the base portion comprises a surface with at least one recess; and
   the cover further comprising a surface with at least one protrusion suitable for engaging the at least one protrusion, forming a pivot.

3. The apparatus of claim 2, wherein the pivot is on an opposite side of the base portion from the hinge.

4. The apparatus of claim 1, wherein the circuit for controlling the intensity of the light source is covered by the bottom surface of the optical portion when the optical portion is retained onto the base portion.

5. The apparatus of claim 1, further comprising a heating circuit comprising a heating element and a thermostat that is coupled in parallel with the heating element.

* * * * *